US010339575B2

(12) United States Patent
Agrawal et al.

(10) Patent No.: US 10,339,575 B2
(45) Date of Patent: Jul. 2, 2019

(54) METHOD AND SYSTEM FOR PROVENANCE TRACKING IN SOFTWARE ECOSYSTEMS

(75) Inventors: Dakshi Agrawal, Monsey, NY (US); Vasileios Pappas, Elmsford, NY (US); Mudhakar Srivatsa, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 295 days.

(21) Appl. No.: 12/718,561

(22) Filed: Mar. 5, 2010

(65) Prior Publication Data

US 2011/0218920 A1  Sep. 8, 2011

(51) Int. Cl.
*G06Q 30/02* (2012.01)
(52) U.S. Cl.
CPC ................. *G06Q 30/0283* (2013.01)
(58) Field of Classification Search
CPC ..... G06Q 30/00; G06Q 30/02; G06Q 30/0283
USPC ............................................. 705/50, 51, 59
See application file for complete search history.

(56) References Cited

U.S. PATENT DOCUMENTS

| | | | | |
|---|---|---|---|---|
| 5,892,900 | A * | 4/1999 | Ginter | G06F 21/10 726/26 |
| 6,314,409 | B2 * | 11/2001 | Schneck | G06F 21/10 705/54 |
| 7,346,545 | B2 | 3/2008 | Jones | |
| 2005/0043960 | A1 | 2/2005 | Blankley | |
| 2005/0198061 | A1 * | 9/2005 | Robinson | H04L 67/104 |
| 2005/0216401 | A1 | 9/2005 | Rines | |
| 2005/0235357 | A1 | 10/2005 | Gagnon et al. | |
| 2007/0088957 | A1 | 4/2007 | Carson | |
| 2007/0150294 | A1 | 6/2007 | Rusman et al. | |
| 2008/0071561 | A1 | 3/2008 | Holcombe | |
| 2008/0178302 | A1 * | 7/2008 | Brock | H04L 63/0263 726/32 |

(Continued)

OTHER PUBLICATIONS

Microsoft ® Computer Dictionary, Fifth Edition, Mar. 15, 2002, 656 pages (Year: 2002).*

(Continued)

*Primary Examiner* — James D Nigh
(74) *Attorney, Agent, or Firm* — Tutunjian & Bitetto, P.C.; Grant Johnson

(57) ABSTRACT

A system and method for tracking provenance for software use and development includes a developer toolkit program stored in memory media and accessible by a software market place wherein the software marketplace provides a library of software bundles that can be used for software development and modification of the software bundles. The developer toolkit includes a user interface configured to enable software creation of original works and derivative works. The development toolkit further includes a provenance tracker configured to track provenance of the derivative works and original works wherein the provenance tracker makes the derivative work and the provenance of the derivative work available in the software market place. The provenance tracker includes a software bundle identification module configured to identify and verify ownership of the original works and derivative works by associating an owner of the derivative works and original works with features included in portions of the derivative works and original works.

25 Claims, 4 Drawing Sheets

(56) References Cited

U.S. PATENT DOCUMENTS

| | | | |
|---|---|---|---|
| 2008/0189155 A1 | 8/2008 | Miloslavsky et al. | |
| 2008/0263658 A1* | 10/2008 | Michael | G06F 21/562 726/22 |
| 2009/0158432 A1* | 6/2009 | Zheng | G06F 21/562 726/24 |
| 2009/0182573 A1 | 7/2009 | Lidestri | |
| 2009/0198543 A1 | 8/2009 | Pastorelli et al. | |
| 2010/0161575 A1* | 6/2010 | Basso | G06F 16/219 707/705 |

OTHER PUBLICATIONS

Nmap tutorial—port scanning remote hosts (retrieved from http://www.binarytides.com/port-scanning-and-network-discovery-with-nmap/, attributed to Silver Moon, Aug. 15, 2012, 7 pages (Year: 2012).*

"Understanding TCP Port Scanning", retrieved on Jan. 25, 2018 from https://www.juniper.net/documentation/en_US/junos/topics/concept/reconnaissance-deterrence-port-scan-understanding.html, posted on Nov. 3, 2017, 2 pages (Year: 2017).*

Gubbels, "Hands in the Honeypot", SANS Institute, Nov. 3, 2002, 17 pages (Year: 2002).*

Danen, Scanning with nmap, TechRepublic, Apr. 7, 2006, 2 pages (Year: 2006).*

"What is a Port Scan", retrieved from https://www.paloaltonetworks.com/cyberpedia/what-is-a-port-scan on Jun. 7, 2018, 3 pages (Year: 2018).*

Port Scanner, retrieved from https://en.wikipedia.org/wiki/Port_scanner, Jun. 7, 2018, 7 pages (Year: 2018).*

Gates ("The Modeling and Detection of Distributed Port Scans: A Thesis Proposal", Technical Report CS-2003-01, Jan. 17, 2003, 76 pages) (Year: 2003).*

Whyte ("Network Scanning Detection Strategies for Enterprise Networks", Carleton University, Sep. 2008, 190 pages) (Year: 2008).*

Moon ("Nmap tutorial—port scanning remote hosts", Aug. 2012, 7 pages) (Year: 2012).*

Kaneda, et al. "Royalty Rate of Business Method Patents for Large Scale Software Applications" Proceedings of the Third International Conference on Information Technology and Applications (ICITA '05), vol. 1. Jul. 2005. pp. 76-81.

Lin, et al. "Convincing Exploitable Software Vulnerabilities: an Efficient Input Provenance Based Approach" The 38th Annual IEEE/IFIP International Conference on Dependable Systems and Networks, DSN 2008. Jun. 2008. pp. 247-256.

Sabaa, et al. "Data Authentication and Provenance Management" Proceedings of the Second International Conference on Digital Information Management. vol. 1. Oct. 2007. pp. 309-314.

Tie-Boe, et al. "Royalty Model Research on Horizontal Differentiation Product Market" ICMSE International Conference on Management Science and Engineering . Oct. 2006. pp. 293-296.

* cited by examiner

METHOD AND SYSTEM FOR PROVENANCE TRACKING IN SOFTWARE ECOSYSTEMS

BACKGROUND

Technical Field

The present invention relates to provenance tracking of software authorship rights and more particularly to a system and method for monitoring rights to ensure compensation for original and derivative software bundles.

Description of the Related Art

Recently centralized marketplaces for software applications, such as mobile application stores (e.g., Nokia® Ovi Store, Apple® App Store, Amazon® EC2 DevPay AMIs) where developers upload their applications, have become very popular, and for a small fee, users are allowed to download applications. These stores have been profitable to both developers and store providers (Nokia®, Apple®, etc.). One of the reasons why these stores are successful is the loyalty of their users, e.g., for an iPhone® user, the Apple® App Store is the only authoritative place to download iPhone® applications and so forth.

However, as virtualized application images become more popular, these stores may wish to incentivize and encourage derivative work to offer better application images with the appropriate permissions. In this model, a developer will checkout a virtual image, possibly created by other developers, enhance the image by adding more applications, change configurations, etc. and check-in the modified image for sale as a new application image.

The current state of the art does not provide solutions for provenance tracking and does not encourage image sharing in a way that will lead to others modifying an image and putting the repackaged image for sale. Some companies provide a market place for shared VM images. These work as follows: a developer after creating a new VM or rebundling an existing one, makes it available for other users as a paid VM. A paid VM has a product code that belongs to the original developer, and stays with the VM even if it is rebundled. Unfortunately, anyone with a privileged access to the VM (root access) can change or remove the product code of the original VM or the rebundled one.

SUMMARY

A system and method for tracking provenance for software use and development includes a developer toolkit program stored in memory media and capable of accessing a software market place wherein the software marketplace provides a library of software bundles that can be used for software development and modification of the software bundles. The developer toolkit includes a user interface configured to enable software creation of original works and derivative works. The development toolkit further includes a provenance tracker configured to track provenance of the derivative works and original works wherein the provenance tracker makes the derivative work and the provenance of the derivative work available in the software market place. The provenance tracker includes a software bundle identification module configured to identify and verify ownership of the original works and derivative works by associating an owner of the derivative works and original works with features included in portions of the derivative works and original works.

A method for tracking provenance for software use and development includes providing a library of software bundles stored in memory media, the library being used for software development and modification of the software bundles and being accessible by at least one software market place; identifying one or more owners of the software bundles by identifying portions of the one or more software bundles associated with that owner based upon features of the portions of the one or more software bundles; and providing access to the software bundles in a software market place such that use by others is tracked to provide compensation for the one or more owners.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
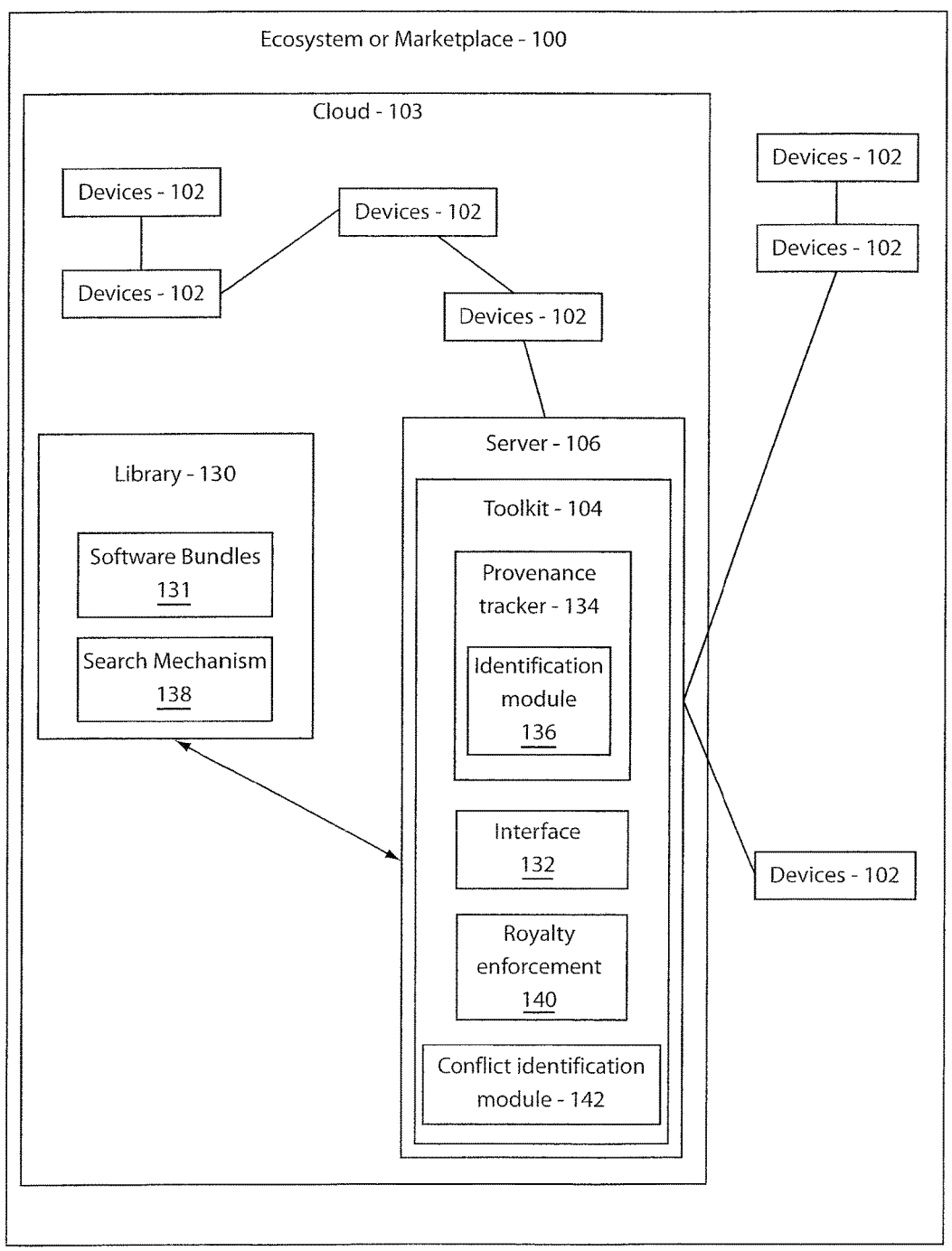
FIG. 1 is a block diagram showing a marketplace environment where software bundles are distributed, created, modified and tracked in accordance with the present principles.

In accordance with the present principles, an entity that controls a software market place can control the software that can be deployed or delivered by its systems. A system and method provide a developer toolkit in conjunction with a portal to upload and download images and certain backend processes. The system and method provide tracking of the provenance of the software with high confidence and proper royalty payment consistent with store policies.

A plurality of methods for tracing back the various origins of the software are also included. These include a non-cryptographic based method and a cryptographic based method. Other methods are also possible and contemplated in accordance with the present principles. The system includes an arrangement of backend servers, a front end developer toolkit and portals that connect the servers to the toolkit. The non-cryptographic based approach uses the fact that two software images may originate from a same source and may be rebundled with others, and share many similarities with their executable or byte code (assuming no code obfuscation or encryption). Using this, a market place provider can construct a "family forest" of the market place and identify branches of the trees that do not pay royalties to their ancestors (if the ancestors require such payment). This approach takes advantage of the fact that most users do not try to cheat the system, and as such it is possible to construct a very accurate software tree structure (based on the rebundling information of the legitimate users). Thus, identifying a branch of the tree that best matches software images from users that try to cheat the system can be very accurate.

This solution does not share the drawbacks of a product key solution, i.e. privileged users cannot easily cheat the system. On the other hand, users that would try to obfuscate the source code or encrypt the executable code, would be required to access the source code and be a highly experienced technical user.

The cryptographic based approach has all the software that becomes available in the market place cryptographically signed and encrypted by the market place provider. The encrypted executable software becomes available on a developer's community (no source code sharing) and can be rebundled with other software (encrypted or unencrypted if no royalty payments are required). Then, once the new software becomes available in the market place, its executable code can be decrypted and run unencrypted on the various platforms (hypervisors, smart-phones, etc), or it can run as an encrypted code on the various platforms.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGs. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to the drawings in which like numerals represent the same or similar elements and initially to FIG. 1, an illustrative market place environment or ecosystem 100 is depicted for generating and modifying distributable objects, such as virtual machines or applications, and provenance tracking of such objects. Ecosystem 100 includes a network of devices 102. The network of devices 102 may include a cloud network 103 or other networks. These devices 102 may include computers, cell phones, music players, handheld computing devices and the like. A developer toolkit 104 is integrated within the market place environment (e.g., a web portal server (106)). The toolkit 104 may be implemented in software on a server or computing device 106. The toolkit 104 enables searching, uploading and downloading of shared royalty-based or royalty-free software, development of derivative works (modification of existing software), tracking of the provenance of the software, identification of royalty conflicts based on payment policies, enforcement of royalty payments based on various payments schemes, identification of illegitimate users/developers (these may be subsequently banned from system use), etc.

The developer toolkit 104 enables tracking provenance for software use and development. The developer toolkit 104 is preferably a software program stored in memory media and is capable of accessing a software marketplace or ecosystem 100 (which provides access by other users or subscribers). The software marketplace 100 provides a library 130 of software bundles 131 that can be used for software development and modification of the software bundles 131. The developer toolkit 104 includes a user interface 132 configured to enable software creation of original works and derivative works. The development toolkit 104 further includes a provenance tracker 134 configured to track provenance of the derivative works and original works. The provenance tracker 134 makes an original work, the derivative work and the provenance of these works available in the software marketplace 100. The provenance tracker 134 includes a software bundle identification module 136 configured to identify and verify ownership of the original works and derivative works by associating an owner of the derivative works and original works with features included in portions of the derivative works and original works.

The library 130 of software bundles includes a search mechanism 138 configured to search for software bundles that are compatible with user specified policies and constraints. The policies and constraints may be created by the user or be provided by the system 100. The developer toolkit 104 obtains the policies and constraints associated with the software bundles in the library 130, and provides the tools (agreement enforcement, royalty payments etc.) for development of derived software based on the software bundles used. The developer toolkit 104 includes a royalty enforcement mechanism 140 to determine payments for use of original and derivate works in accordance with one or more payment policies associated with the software bundles in the library 130. The developer toolkit may further include a conflict identification module 142 configured to identify conflicts in the payment policies based on payment agreements, charging models, etc.

The software bundle identification module 136 identifies software bundles based upon cryptographic signatures embedded in the bundles, fingerprint-based identification which identifies patterns of a running image which are similar to patterns of images the running image is derived from, non-cryptographic based approaches which may employ a similarity measure between software images, etc. The cryptographic signatures may include metadata that is created to uniquely identify a creator/owner of the software bundle and is bound to an object in the library 130 with a symmetric key derived from the metadata. The signature of the object uses the symmetric key. A tree structure may be constructed in which branches of the tree structure indicate provenance for royalty payments, conflict resolution, etc. and identify illegitimate users and developers of the software bundles, among other things.

Figure 2:
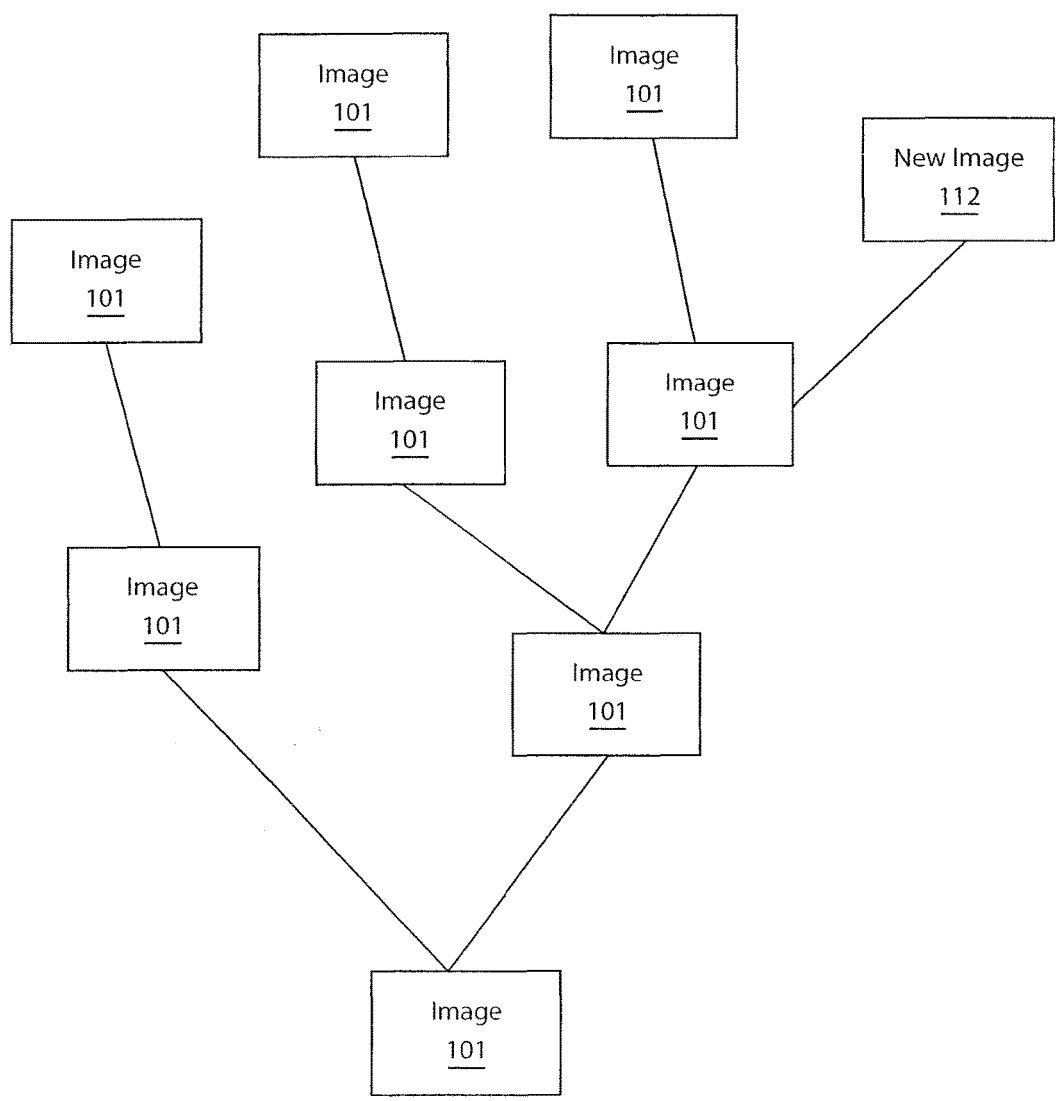
FIG. 2 is a block diagram showing an illustrative tree constructed to track provenance in accordance with the present principles.

Referring to FIG. 2, the toolkit 104 may employ image-based identification. Since software images 101 share a lot of similarities at the byte-level or block level, a multi-rooted tree can be created that captures origins of an image based on image similarities. Whenever a new software image is added to the marketplace 100, a point of attachment in an image tree 110 is identified using a similarity metric (e.g., a Jaccard coefficient or the like). An image 112 is added in the tree 110 if a user agrees with the match. If not, a semi-manual process is triggered to identify the image.

The image identification may include a cryptographic-based identification. Cryptographic-based identification tracks the flow of information with all newly created software, and works only when software is created with marketplace tools. For each object D (library, VM image, etc.), metadata M(D) is created that uniquely identifies the creator(s) of the software (e.g., a list of creator IDs). D is bound to M(D) with a symmetric key K derived from M(D) and a signature of D using K. Other cryptographic techniques may also be employed.

The image identification may include a fingerprint-based identification. Fingerprint in this sense refers to patterns associated with the generation, use and history of an object. The patterns of a running image are similar to the patterns of the image it is derived from. Running patterns can be based on system call sequences, network traffic patterns, etc. A similarity tree may be generated based on the running patterns of images to track provenance of the image.

The image identification may include a non-cryptographic approach. Again, this approach makes use of the fact that the software images that originate from the same image and have been rebundled are very similar to each other. For example, it is well known that virtual machine (VM) images originating from the same operating system are very similar to each other when compared at different block sizes (ranging from, e.g., 1 KB to 64 KB). Similarly the binary execution code or the byte-code of software that originates from the same source code basis is very similar. Given this, one can generate a similarity metric between two software images. For example, one can use the Jaccard coefficient to measure the similarity of two VM images.

This may include the following: if B1 is the set of blocks of the first image and B1 is the set of blocks of the second image then their similarity can be defined as follows: S=|B1 ∩B2 |/|B1 4 B2 |. Other similarity metrics may include, e.g., an inner product of two images when they are represented as vectors in a multidimensional space (with dimensions being all image blocks present in the system), a line-by-line comparison of the code, etc.

The non-cryptographic based solution will illustratively be described using the Jaccard coefficient as a similarity metric and in the context of VM images of a cloud computing environment, but the same solution can be applied in the context of mobile phone application marketplaces or with other similarity metrics in any other systems.

Whenever a user creates a new VM image 112 and stores it in an image library (130, FIG. 1) of the cloud (103), an infrastructure provider calculates the similarity metric of this new image against all other images already present in the VM library 130, and identifies a branch of the image library tree 110 that has the highest similarity metric with the new image 112. If the new image 112 is an image that enables royalty payments to the creators of the image(s) that it is based on, then it will be accompanied with a set of metadata (M(D)) (e.g., product code) that can identify the point of attachment of this image at the image library tree 110. If the point of attachment is the same as the branch of the tree 110 that gives the highest similarity metric, then the new image 112 becomes available in the library 130 with no further action, and the new image 112 is attached on the image tree 110 by using the above branching point. In contrast, if the point of attachment is different, then a secondary process is employed to verify the validity of the image (this validation process is described below).

In the case where the new image 112 is royalty free and the branch with the highest similarity metric is a royalty free branch, then the new image again becomes available in the library 130 with no further action, and the new image 112 is attached on the image tree 110 by using the above branching point. In contrast, if the branch, with the closest similarity to the royalty free image, enables royalty payments then the validity of the image is verified (by the validation process). Note that this process makes use of one branching point, the one with the highest similarity metric. It is possible to extend the same process by using the top X branches with the highest similarity metric to reduce the number of false positives (with the caveat of increasing the number of true negatives). In general, with the advent of fast algorithms to compute graph similarity measures, such comparison can be extended to include measures that take a more enriched set of relationships into account (instead of just parent-child as in a tree structure).

The secondary validation process, both of the royalty free and the royalty enabled images that do not pass the first validation process, can be manual or automated. The module 136 (FIG. 1) is preferably responsible for the validation processes. A manual process may include cloud infrastructure personnel contacting the author of the image to gather further information about the image contents and development process. The automated validation can use one of the techniques from the following non-exhaustive list: 1) Automated validation can look at the development history of the same developer (or accounts that can be attributed to the same developer) and identify any irregular patterns. For example, check if the number of images created by the same developer have triggered the secondary validation process abnormally many times, or check if the images created by the same developer have high similarity with images created by other illegitimate users in the past, etc. 2) Automated validation can look at the contents of the VM (file level content) and identify any content that is not royalty free and which is not included in the list of royalty enabled software included in the image metadata. 3) Automated validation can finger print a running instance of the VM image (e.g. run a port scan) and identify any software that is not royalty free and is not included in the list of royalty enabled software included in the image metadata.

After running the secondary validation process a decision can be made as to whether the new image 122 is a legitimate image or an image of a user that is trying to cheat the system.

In the legitimate image case, the image becomes available in the image library 130, and the image tree 110 gets updated by adding the new image 112 to the branch of the tree 110 as dictated by the image metadata for the royalty enabled images, or the branch with the highest similarity metric for the royalty free images.

A cryptographic approach: (i) tracks the flow of information between existing files (or a VM image) to a newly created file (or VM image) using program analysis techniques; and (ii) securely binds a pedigree of a file (or VM image) to the file's metadata using cryptographic techniques. We will use a term information object D to denote a file, directory (an unordered list of files) and a VM image (a tree/forest of directories). Each information object D will be associated with metadata M(D) that includes the pedigree of D (namely, an unordered list of product IDs that have been used to create/update the contents of D) besides traditional file/directory attributes such as owner, read-write-execute permissions, creation time, last modified time, etc. Two questions include: How to determine M(D) when D is created/modified, and how to bind M(D) with D so that a malicious user cannot undetectably corrupt (or delete) M(D).

There is a plurality of solutions to determine M(D). In one embodiment, a fine-grained taint propagation algorithm may be employed to track the flow of information from other information objects (D1, D2, . . . , Dn) to the information object D. In another embodiment, coarse grained information flows may be inferred, by simple file open/close system calls—in this approach, we presume or infer a set of all information objects that were "opened" by a process that creates/modifies an information object D. In either case, M(D)=union{M(D1), . . . , M(Dn)}.

We bind M(D) to D as follows. First, a platform owner uses a keyed pseudo-random function (that is non-invertible and collision resistant under reasonable computational assumptions, e.g., HMAC-SHA256) to derive a symmetric key K from M(D) (e.g., K=HMAC-SHA256(KA, M(D))), where KA denotes the platform owner's secret key. The platform owner signs the information object D using key K (e.g., again using HMAC-SHA256–sig(D)=HMAC-SHA256(K, D)). Now, we observe that any attempts to corrupt/delete can be detected by the platform by cross-verifying sig(D) against M(D) and D.

Some advantages of this include fine grained tracking of information flows (using program analysis), which guarantees correctness of M(D). Unlike the non-cryptographic approaches, this approach does not suffer from false positives or false negatives. While it is easy to perform program analysis within a single program/process, it is difficult in a distributed system where an adversary may use FTP, SCP utilities to copy portions of an information object D1 into a newly created information object D. The process that is creating D may not be aware of the pedigree of D1 unless we modify utilities like FTP/SCP to guarantee metadata propagation as well.

Figure 3:
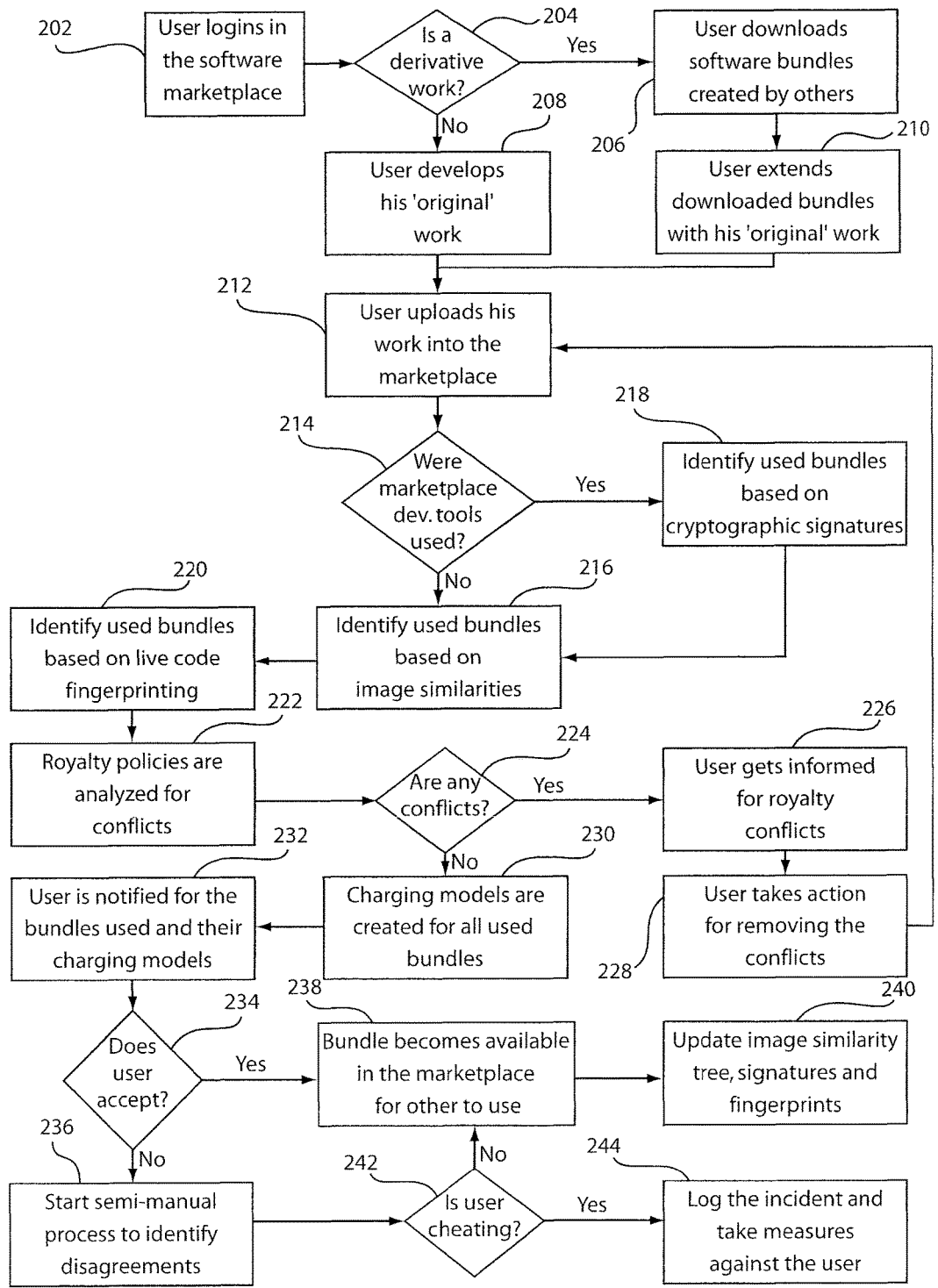
FIG. 3 is a block/flow diagram showing a system/method for identifying ownership for original and derivative work on software and tracking provenance to provide appropriate royalty payments in accordance with the present principles.

Referring to FIG. 3, a block/flow diagram shows an illustrative system/method for implementing provenance monitoring of software in an ecosystem. In block 202, a user logs into a software marketplace or similar environment (cloud network, etc.). In block 204, a given software object is evaluated to determine whether it is original or a derivative work. If it is a derivative work, the user downloads software bundles created by them or by others to work on to create the derivative work in block 206. In block 210, the user extends the downloaded bundles as desired. If the work is not a derivative work as determined in block 204 or after the work is extended (derived) in block 210, the user develops and completes the work in block 208.

In block 212, the user uploads the work into the marketplace. In block 214, a determination of whether marketplace derived tools were used is made. If marketplace tools were used, bundles that were employed may be identified based on cryptographic signatures in block 218. If marketplace tools were not used or after the tools have been identified in block 218, used bundles may be identified based upon image similarities in block 216. In block 220, used bundles may be identified based on live code fingerprinting (patterns). Blocks 216, 218 and 220 may all be employed or any one may be employed as needed to identify the bundle source(s). It should also be understood that other identification/verification techniques may be used instead of or in addition to those mentioned here.

In block 222, once the bundle sources are identified, royalty policies are analyzed for conflicts. If conflicts exist as determined in block 224, the user is informed of the conflicts in block 226, and the user or the system takes action to remove/resolve the conflicts in block 228. This may include payments of royalties, setting up a royalty arrangement, determining the status of the bundle (e.g., the bundle may have been dedicated to the public or made shareware, etc.). The resolution of conflicts includes returning to block 212 to upload the work with the resolutions.

If no conflicts arise in block 224, charging models are created or determined for royalties or licenses for all used bundled that need it. Charging models refer to fee payment schedules or formulas used to determine the amount of money owed for the bundles. In block 232, the user is notified for the bundles used and the charging models associated with the bundles. In block 234, a user is queried to accept or reject the charging models. If the user rejects, a process is triggered to resolve any disagreements. This process may be manual, automated or include elements of both (semi-manual) in block 236. If the user accepts, the bundle becomes available in the marketplace for others to use in block 238. In block 242, a determination is made as to whether the user is cheating. This may be performed based on information collected in the identification processes (e.g., blocks 216, 218, and 220). If unauthorized or unidentifiable bundles are employed, the work will be suspect. If the user is determined not to be cheating, the bundle becomes available in block 238. Otherwise, the incident is logged and measures are taken against the user in block 244. Once a bundle has been cleared for availability in the marketplace, a similarity tree, signatures and fingerprints are updated in block 240 to provide tracking of the work.

Figure 4:
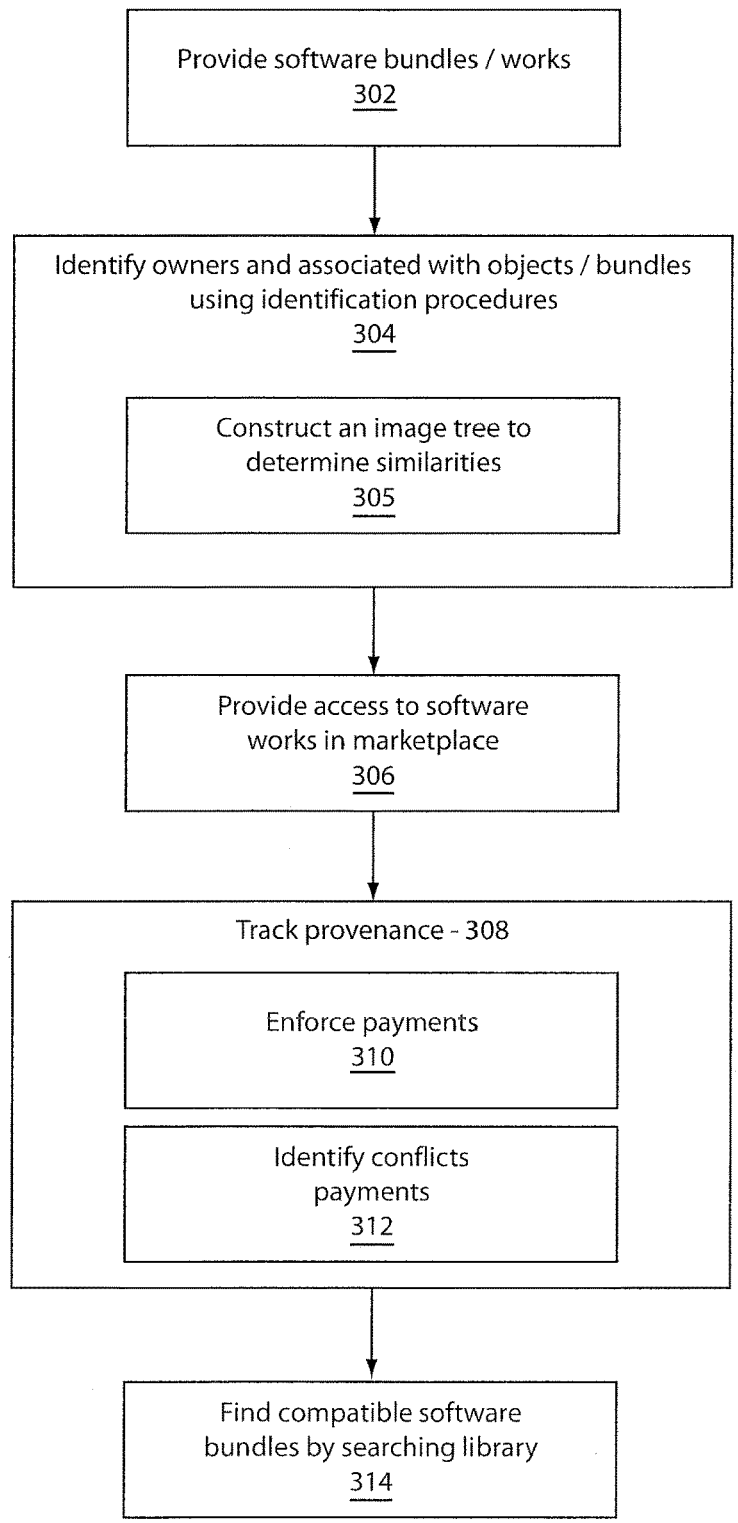
FIG. 4 is a block/flow diagram showing another system/method for identifying ownership for original and derivative work on software and tracking provenance to provide appropriate royalty payments in accordance with the present principles.

Referring to FIG. 4, a system/method for tracking provenance for software use and development is illustratively depicted in accordance with another embodiment. In block 302, one or more software works based upon a library of software bundles stored in memory media are provided. The library is used for software development and modification of the software bundles and is accessible by a software market place. In block 304, one or more owners for software works are identified. Portions of the one or more software works are associated with that owner (e.g., author or authors) based upon features of the portions of the software works. The identification process includes identifying the owner based upon a cryptographic signature associated with an information object, a fingerprint-based identification which identifies patterns of a running image which are similar to patterns of images the running image is derived from, and/or a non-cryptographic based approach which employs a similarity measure between software images. Other methods may also be employed. In block 305, a tree structure is constructed in which branches of the tree structure indicate provenance for royalty payments and/or in which branches of the tree structure identify illegitimate users and developers of the software works.

In block 306, access to the software works is provided in a software market place such that use by others is tracked to provide compensation for the one or more authors. In block 308, provenance of derivative works is tracked to identify and verify ownership in the derivative works. Royalty payments for use of original and derivative works is enforced in accordance with one or more payment policies associated with the software bundles in the library in block 310. Conflicts are identified in the payment policies based on payment agreements in block 312. In block 314, the software bundles in the library can be searched to determine software bundles that are compatible with user specified policies and constraints.

Having described preferred embodiments of a system and method for provenance tracking in software ecosystems (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system for tracking provenance for software use and development, comprising:
 a processor coupled to a non-transitory computer-readable storage medium, the processor being configured to execute instructions stored on the computer-readable storage medium to:
 access, using the processor, at least one software market place including a library of software bundles for software development and modification of the software bundles using a developer toolkit, the processor being further configured to:
 perform software creation of original works and derivative works using a user interface; and
 determine provenance of the derivative works and original works using a provenance tracker, wherein the provenance tracker makes the derivative work and the provenance of the derivative work available in the software market place, the provenance tracker including a software bundle identification module, the identification module being configured to identify and verify ownership of the original works and derivative works at least by associating an owner of the derivative works and original works with features included in portions of the derivative works and original works, and being further configured to verify a validity of the derivative works using a primary and secondary validation process,
 wherein the primary validation process includes employing a similarity metric between sets of blocks in the derivative work and the original work,
 wherein the secondary validation process includes identifying irregular patterns in a development history of the owner of the derivative works, and fingerprinting a running instance of a virtual machine (VM) image, the fingerprinting comprising:

taking a sequence of port scans of an original image and storing determined machine behavior for the original image as a reference, taking a sequence of port scans of a running image with an unknown provenance to determine machine behavior for the image with the unknown provenance, and comparing the sequence of port scans of the running image with the sequence of port scans of the original image to determine whether the running image is a derivative of the original image and to identify non-royalty free content not designated as royalty enabled software included in metadata of an image, wherein the secondary validation process is performed upon a failure to verify using the primary validation process, and the identifying irregular patterns includes determining a degree of similarity between a current developer and previously identified illegitimate users, and wherein use by others is tracked by providing access to validated software bundles in a software market place for determining appropriate compensation for the one or more owners.

2. The system as recited in claim 1, wherein the library of software bundles includes a search mechanism configured to search for software bundles that are compatible with user specified policies and constraints.

3. The system as recited in claim 2, wherein the developer toolkit obtains the policies and constraints associated with the software bundles and provides tools for development of derived software based on the software bundles.

4. The system as recited in claim 1, wherein the developer toolkit includes a royalty enforcement mechanism to determine payments for use of original and derivative works in accordance with one or more payment policies associated with the software bundles in the library.

5. The system as recited in claim 1, wherein the developer toolkit includes a conflict identification module for identifying conflicts in the payment policies based on payment agreements.

6. The system as recited in claim 1, wherein the software bundle identification module identifies software bundles based upon cryptographic signatures embedded in the bundles.

7. The system as recited in claim 6, wherein the cryptographic signatures include metadata that is created to uniquely identify a creator of the software bundle and is bound to an object in the library with a symmetric key derived from the metadata, and a signature of the object uses the symmetric key.

8. The system as recited in claim 1, wherein software bundle identification module includes a fingerprint-based identification which identifies patterns of a running image which are similar to patterns of images the running image is derived from.

9. The system as recited in claim 1, wherein software bundle identification module includes a non-cryptographic based approach which employs a similarity measure between software images.

10. The system as recited in claim 9, further comprising a tree structure constructed in which branches of the tree structure indicate provenance for royalty payments.

11. The system as recited in claim 9, further comprising a tree structure constructed in which branches of the tree structure identify illegitimate users and developers of the software bundles.

12. A method for tracking provenance for software use and development, comprising:

accessing, using a processor coupled to a memory, at least one software marketplace including a library of software bundles stored in a non-transitory computer readable storage medium using a developer toolkit, the library being used for software development and modification of the software, the processor being further configured for:

performing software creation of original works and derivative works;

determining provenance, using a processor coupled to a non-transitory computer-readable storage medium, of one or more of the derivative works and the original works using a provenance tracker, wherein the provenance tracker makes the derivative works and the provenance of the derivative works available in the software market place;

identifying and verifying one or more owners of the software bundles at least by identifying portions of the one or more software bundles associated with the one or more owners based upon features of the portions of the one or more software bundles;

identifying and verifying a validity of derivative works of the software bundles using a primary and secondary validation process, wherein the primary validation process includes employing a similarity metric between sets of blocks in the derivative work and the original work, wherein the secondary validation process includes identifying irregular patterns in a development history of the owner of the derivative works, and fingerprinting a running instance of a virtual machine (VM) image, the fingerprinting comprising:

taking a sequence of port scans of an original image and storing determined machine behavior for the original image as a reference, taking a sequence of port scans of a running image with an unknown provenance to determine machine behavior for the image with the unknown provenance, and comparing the sequence of port scans of the running image with the sequence of port scans of the original image to determine whether the running image is a derivative of the original image and to identify non-royalty free content not designated as royalty enabled software included in metadata of the software bundles, wherein the identifying irregular patterns includes determining a degree of similarity between a current developer and previously identified illegitimate users; and tracking use by others by providing access to validated software bundles in a software market place for determining appropriate compensation for the one or more owners.

13. The method as recited in claim 12, wherein providing access includes tracking provenance of derivative works to identify and verify ownership in the derivative works.

14. The method as recited in claim 12, further comprising searching the software bundles to determine software bundles that are compatible with user specified policies and constraints.

15. The method as recited in claim 14, wherein providing access includes enforcing royalty payments for use of original and derivate works in accordance with one or more payment policies associated with the software bundles in the library.

16. The method as recited in claim 15, further comprising identifying conflicts in the payment policies based on payment agreements.

17. The method as recited in claim 12, wherein identifying includes identifying one or more owners based upon a cryptographic signature associated with an information object.

18. The method as recited in claim 17, wherein the cryptographic signature includes metadata that is created to uniquely identify an owner of the software bundle and is bound to an object in the library with a symmetric key derived from the metadata, and the cryptographic signature of the object uses the symmetric key.

19. The method as recited in claim 12, wherein identifying includes identifying one or more owners based upon a fingerprint-based identification which identifies patterns of a running image which are similar to patterns of images the running image is derived from.

20. The method as recited in claim 12, wherein identifying includes identifying one or more owners based upon a non-cryptographic based approach which employs a similarity measure between software images.

21. The method as recited in claim 20, further comprising constructing a tree structure in which branches of the tree structure indicate provenance for royalty payments.

22. The method as recited in claim 20, further comprising constructing a tree structure in which branches of the tree structure identify illegitimate users and developers of the software works.

23. A non-transitory computer readable storage medium coupled to a processor comprising a computer readable program for tracking provenance for software use and development, wherein the computer readable program when executed on a computer causes the computer to perform the steps of:
  accessing, using the processor, at least one software marketplace including a library of software bundles stored in a non-transitory computer readable storage medium using a developer toolkit, the library being used for software development and modification of the software bundles, the processor being further configured for:
    performing software creation of original works and derivative works;
    determining provenance of one or more of the derivative works and the original works using a provenance tracker, wherein the provenance tracker makes the derivative works and the provenance of the derivative works available in the software market place;
    identifying and verifying one or more owners of the software bundles at least by identifying portions of the one or more software bundles associated with the one or more owners based upon features of the portions of the one or more software bundles; and
    identifying and verifying a validity of derivative works of the software bundles using a primary and secondary validation process,
      wherein the primary validation process includes employing a similarity metric between sets of blocks in the derivative work and the original work, and
      wherein the secondary validation process includes identifying irregular patterns in a development history of the owner of the derivative works, and fingerprinting a running instance of a virtual machine (VM) image, the fingerprinting comprising:
        taking a sequence of port scans of an original image and storing determined machine behavior for the original image as a reference,
        taking a sequence of port scans of a running image with an unknown provenance to determine machine behavior for the image with the unknown provenance, and
        comparing the sequence of port scans of the running image with the sequence of port scans of the original image to determine whether the running image is a derivative of the original image and to identify non-royalty free content not designated as royalty enabled software included in metadata of the software bundles,
      wherein the secondary validation process is performed upon a failure to verify using the primary validation process, and the identifying irregular patterns includes determining a degree of similarity between a current developer and previously identified illegitimate users; and
    tracking use by others by providing access to validated software bundles in a software market place for determining appropriate compensation for the one or more owners.

24. The computer readable storage medium as recited in claim 23, wherein identifying includes at least one of:
  identifying one or more owners based upon a cryptographic signature associated with an information object;
  identifying one or more owners based upon a fingerprint-based identification which identifies patterns of a running image which are similar to patterns of images the running image is derived from; and
  identifying one or more owners based upon a non-cryptographic based approach which employs a similarity measure between software images.

25. The computer readable storage medium as recited in claim 24, wherein the cryptographic signature includes metadata that is created to uniquely identify an owner of the software bundle and is bound to an object in the library with a symmetric key derived from the metadata, and the cryptographic signature of the object uses the symmetric key.

* * * * *